(12) United States Patent
Kawashima et al.

(10) Patent No.: US 9,496,771 B2
(45) Date of Patent: Nov. 15, 2016

(54) ELECTRIC MOTOR

(75) Inventors: Yoshichika Kawashima, Kiryu (JP);
Teppei Tokizaki, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 331 days.

(21) Appl. No.: 14/234,338

(22) PCT Filed: Jul. 27, 2012

(86) PCT No.: PCT/JP2012/069152
§ 371 (c)(1),
(2), (4) Date: Jan. 22, 2014

(87) PCT Pub. No.: WO2013/015409
PCT Pub. Date: Jan. 31, 2013

(65) Prior Publication Data
US 2014/0159527 A1  Jun. 12, 2014

(30) Foreign Application Priority Data

Jul. 27, 2011 (JP) .................................. 2011-164304
Nov. 16, 2011 (JP) .................................. 2011-250721

(51) Int. Cl.
*H02K 13/00* (2006.01)
*H02K 13/04* (2006.01)
(Continued)

(52) U.S. Cl.
CPC .............. *H02K 13/04* (2013.01); *H02K 5/148* (2013.01); *H02K 23/04* (2013.01); *H02K 23/30* (2013.01);
(Continued)

(58) Field of Classification Search
CPC .................... H02K 13/04; H02K 23/30; H02K 23/04
(Continued)

(56) References Cited

U.S. PATENT DOCUMENTS

| 5,949,174 A * | 9/1999 | Moss ..................... H01R 39/06 310/128 |
| 7,557,484 B2 * | 7/2009 | Kawashima .......... H02K 23/34 310/198 |

(Continued)

FOREIGN PATENT DOCUMENTS

JP  2004-120952 A  4/2004
JP  2007-6633  1/2007
(Continued)

OTHER PUBLICATIONS

International Search Report for PCT/JP2012/069152 dated Oct. 9, 2012.
(Continued)

*Primary Examiner* — Hanh Nguyen
(74) *Attorney, Agent, or Firm* — Andrews Kurth Kenyon LLP (57) ABSTRACT

An electric motor includes a yoke having a plurality of magnetic poles, a rotary shaft, an armature core (8) attached to the rotary shaft, the armature core (8) having a plurality of teeth (12) and slots (13), an armature coil (9) wound on the teeth (12) through an intensive winding method, a commutator having a plurality of segments (15) installed at the rotary shaft and disposed in a circumferential direction, a low speed brush (21a) and a high speed brush (21b) configured to supply power to the armature coil (9) via the segments (15), and a common brush (21c) commonly used in these brushes, wherein, when n is a natural number of 3 or more, a ratio of the numbers of magnetic poles, slots (13), and segments (15) is set to 2:3:3n.

4 Claims, 9 Drawing Sheets

(51) Int. Cl.
    *H02K 23/04*    (2006.01)
    *H02K 23/30*    (2006.01)
    *H02K 5/14*     (2006.01)
    *H02K 11/02*    (2016.01)
(52) U.S. Cl.
    CPC ......... *H02K 11/026* (2013.01); *H02K 2213/03* (2013.01)
(58) Field of Classification Search
    USPC ........................................ 310/148, 233, 234
    See application file for complete search history.

(56) References Cited

U.S. PATENT DOCUMENTS 8,436,505 B2 * 5/2013 Saito ................... H02K 13/10
                                                     310/233
2010/0052440 A1 * 3/2010 Shioda ................. H02K 5/04
                                                      310/51

FOREIGN PATENT DOCUMENTS

| JP | 2010-226847 | 10/2010 |
| JP | 2010-283930 | 12/2010 |
| JP | 2011-130613 | 6/2011 |
| WO | 2010/010906 | 1/2010 |

OTHER PUBLICATIONS

Japanese Office Action issued in Japanese Patent Application No. 2011-250721, mailed Jun. 14, 2016.

* cited by examiner

ELECTRIC MOTOR

TECHNICAL FIELD

The present invention relates to an electric motor mounted on, for example, a vehicle.

Priority is claimed on Japanese Patent Application Nos. 2011-164304, filed Jul. 27, 2011, and 2011-250721, filed Nov. 16, 2011, the contents of which are incorporated herein by reference.

BACKGROUND ART

For example, as a wiper motor for an automobile, a 3-brush type motor that can switch a rotational speed may be used. In such a motor, an armature on which an armature coil is wound is rotatably disposed inside a cylindrical yoke including a plurality of magnetic poles installed at an inner circumferential surface thereof. The armature has the armature core fitted into and fixed to a rotary shaft from the outside thereof. A slot elongated in an axial direction is formed in the armature core. A plurality of coil in which windings are wound at predetermined intervals according to a distributed winding method are formed in the slot. Each coil is electrically connected to a segment of a commutator attached to the rotary shaft.

Each segment is configured to come in slidable contact with a brush. The brush is constituted by three brushes, i.e., a low speed brush, a high speed brush, and a common brush commonly used with these brushes. The high speed brush is disposed at a more advanced angle than the low speed brush. Then, upon a normal operation, power is supplied by the common brush and the low speed brush, and upon a high speed operation, power is supplied by the common brush and the high speed brush. According to the above-mentioned configuration, in the three-brush type motor, there is a difference in the number of effective conductors in the normal operation and the high speed operation. That is, in the high speed operation, the angle of the motor can be advanced more than in the normal operation and the motor can be operated at a higher number of revolutions than in the normal operation.

However, the motor such as a wiper motor or the like mounted on the vehicle normally needs to be miniaturized due to requirements of improvement of vehicle mountability or the like. For this reason, for example, a motor in which the number of slots of the armature core is set to 16, and the number of magnetic poles is set to 4 is disclosed. In the motor, the coil is wound throughout four teeth according to the number of magnetic poles through the distributed winding method. Then, the coil is connected to the commutator having sixteen segments to which the same electric potentials are short-circuited (for example, see Patent Literature 1).

CITATION LIST

Patent Literature

[Patent Literature 1] Japanese Unexamined Patent Application, First Publication No. 2010-226847

SUMMARY OF INVENTION

Problem to be Solved by the Invention

Here, in the above-mentioned motor of the related art, in order to obtain a large output, a speed reducer (a speed reduction unit) is often connected thereto and used. Here, as a means of miniaturizing the motor, a means of increasing a speed reduction ratio of the speed reducer can be considered. As the speed reduction ratio is increased, an output of the motor itself can be suppressed, and as a result, the motor can be reduced in size.

Here, as the speed reduction ratio is increased, an increase in the number of revolutions of the motor is needed. However, when the number of slots is large, an order determined by a least common multiple between the number of magnetic poles and the number of slots is increased.

For this reason, noise in the motor becomes high pitch, and the noise may be hard on the ears.

In addition, as the number of slots is increased, a shape of the armature core becomes complicated. For this reason, productivity of the armature may be degraded.

Further, since the number of segments per one pole pair is small, a voltage between the segments is increased, and rectification may deteriorate.

Then, since the coil is wound on teeth through the distributed winding method, overlapping of coil ends is increased. For this reason, a wire rod cost of the coil may increase, motor performance may decrease, and the electric motor may increase in size.

In consideration of the above-mentioned circumstances, the present invention is directed to provide an electric motor capable of preventing high pitch noise, increasing productivity of an armature and further improving rectification. In addition, the present invention is directed to provide an electric motor capable of improving motor performance while reducing production cost, and miniaturizing the motor.

Means for Solving the Problem

According to a first aspect of the present invention, an electric motor includes a yoke having a plurality of magnetic poles; a rotary shaft rotatably installed inside the yoke; an armature core attached to the rotary shaft, the armature core having a plurality of teeth radially extending in a radial direction and a plurality of slots formed between the teeth; a coil wound on each of the teeth through an intensive winding method; a commutator installed at the rotary shaft adjacent to the armature core and having a plurality of segments disposed in the circumferential direction; and three brushes constituted by a low speed brush and a high speed brush configured to supply power to the coil via the segments and a common brush commonly used for the brushes, wherein, when n is a natural number of 3 or more, a ratio of the numbers of magnetic poles, slots, and segments is set to 2:3:3n.

According to the above-mentioned configuration, the number of slots can be reduced without deteriorating motor performance. For this reason, an order of the motor can be reduced. For this reason, high pitch noise can be prevented upon high speed rotation of the motor.

In addition, as the number of slots is reduced, a shape of the armature core is simplified. For this reason, productivity of the armature can be increased. Further, as the number of slots is reduced, a size of each slot can be set to be large. For this reason, the number of times the coil is wound on each of the teeth can be set to be large. As a result, the armature core can be reduced in size and weight.

Then, the number of segments is set to three or more times the number of slots, and the number of segments per one pole pair can be increased. For this reason, a voltage between the segments can be set to be small, and rectification can be improved. In addition, since the number of effective conductors of the coil per one segment is reduced, it is possible to easily cope with variation in speed due to the high speed brush.

Further, since the coil is wound around the teeth through the intensive winding method, a space factor of the coil can be improved in comparison with the case in which the coil is wound through the distributed winding method. In addition, overlapping of coil ends can be reduced. For this reason, wire rod cost of the coil can be reduced, and the electric motor can be inexpensively provided. Further, with the same motor performance, the armature core can be reduced in size and the shaft can be reduced in length.

According to a second aspect of the present invention, in the electric motor according to the first aspect of the present invention, the number of magnetic poles is set to 4, the number of slots is set to 6, and the number of segments is set to 18.

According to a third aspect of the present invention, in the electric motor according to the second aspect of the present invention, the coil wound on the teeth includes one normal winding coil formed to be wound in a forward direction, and two reverse winding coils wound in a reverse direction, and when the teeth are sequentially assigned to a U phase, a V phase and a W phase in the circumferential direction, the normal winding coil wound in the phases is set to the coils of the U phase, the V phase and the W phase, and the reverse winding coils wound in the phases are set to the coils of a –U phase, a –V phase and a –W phase, the coils of the U phase, the –W phase, the –W phase, the V phase, the –U phase, the –U phase, the W phase, the –V phase and the –V phase are sequentially and electrically connected between the neighboring segments.

According to the above-mentioned configuration, the electric motor in which high pitch noise is reliably prevented without deteriorating the motor performance, productivity of the armature is increased, and rectification is improved can be provided. In addition, it is possible to provide the electric motor capable of improving the motor performance while reducing production cost, and reducing the size thereof.

According to a fourth aspect of the present invention, in the electric motor according to any one of the first to third aspect of the present invention, both end sides in the axial direction of the rotary shaft are rotatably supported via bearings, and at least one of the bearings is a rolling bearing.

According to the above-mentioned configuration, the rotary shaft can be efficiently rotated even when the number of revolutions of the rotary shaft is increased. As a result, a highly efficient electric motor can be provided.

According to a fifth aspect of the present invention, in the electric motor according to any one of the first to fourth aspects of the present invention, the commutator is a flat type disk commutator, and the plurality of segments are disposed on a rotary sliding surface of the disk commutator in the circumferential direction.

According to the above-mentioned configuration, an increase in a size of a circumference of the brush can be prevented while maintaining a small size and a light weight of the entire electric motor. In addition, as the disk commutator is employed, the brushes are disposed in the axial direction. For this reason, the brushes are not disposed to extend outward in the radial direction. As a result, the diameter of the commutator can be set to be large. Here, in the plurality of segments disposed on the rotary sliding surface, a width in the circumferential direction is formed to gradually expand outward in the radial direction. For this reason, when the diameter of the commutator is set to be large, a width in the circumferential direction of the segment can be set to be large. For this reason, the same motor performance as of the two-pole motor can be obtained without significantly reducing the width in the circumferential direction of the brush.

Advantageous Effects of Invention

According to the present invention, since the number of slots can be reduced without degrading motor performance, an order of the motor can be reduced. For this reason, high pitch noise can be prevented upon rotation of the motor at a high speed.

In addition, as the number of slots is reduced, the shape of the armature core can be simplified and productivity of the armature can be increased. Further, as the number of slots is reduced, a size of each slot can be set to be large. For this reason, the number of times the coil is wound on each tooth can be set to be large, and as a result, the armature core can be reduced in size and weight.

Further, as the number of segments is set to be larger three or more times the number of slots, the number of segments per one pole pair can be increased. For this reason, a voltage between the segments can be reduced, and rectification can be improved. In addition, since the number of effective conductors of the coil per one segment is reduced, it is possible to easily cope with a variation in speed due to the high speed brush.

Further, since the coil is wound on the teeth through an intensive winding method, a space factor of the coil can be improved in comparison with the case in which the coil is wound through the distributed winding method as described in the related art. Furthermore, overlapping of the coil ends can be reduced. For this reason, wire rod cost of the coil can be reduced, and an inexpensive electric motor can be provided. In addition, when the motor performance is the same, the armature core can be reduced in size and the shaft can be reduced in length.

DESCRIPTION OF EMBODIMENTS

First Embodiment (Reduction Motor)

Next, a first embodiment of the present invention will be described with reference to FIGS. 1 to 5.

Figure 1:
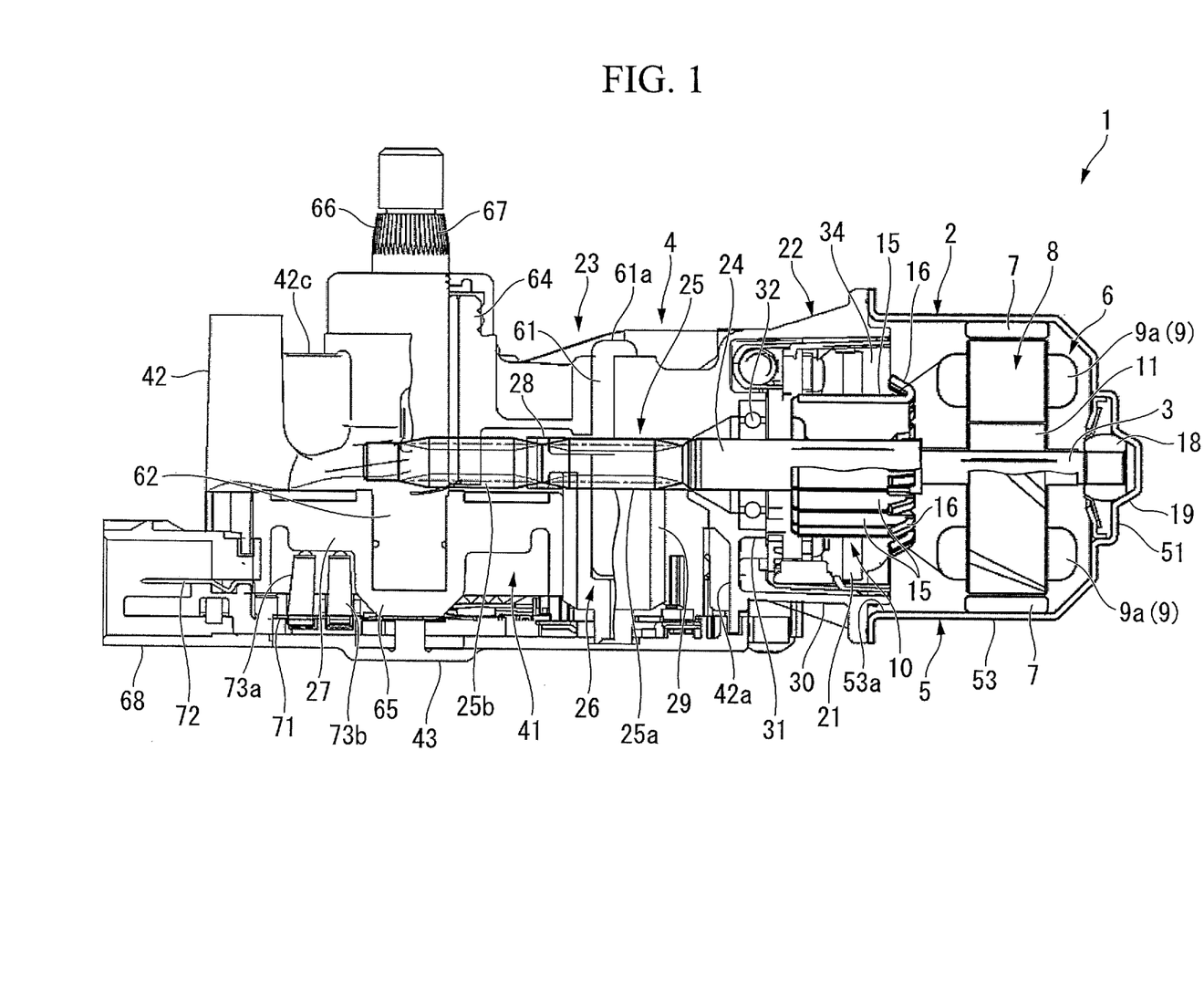
FIG. 1 is a longitudinal cross-sectional view of a reduction motor according to a first embodiment of the present invention.
Figure 2:
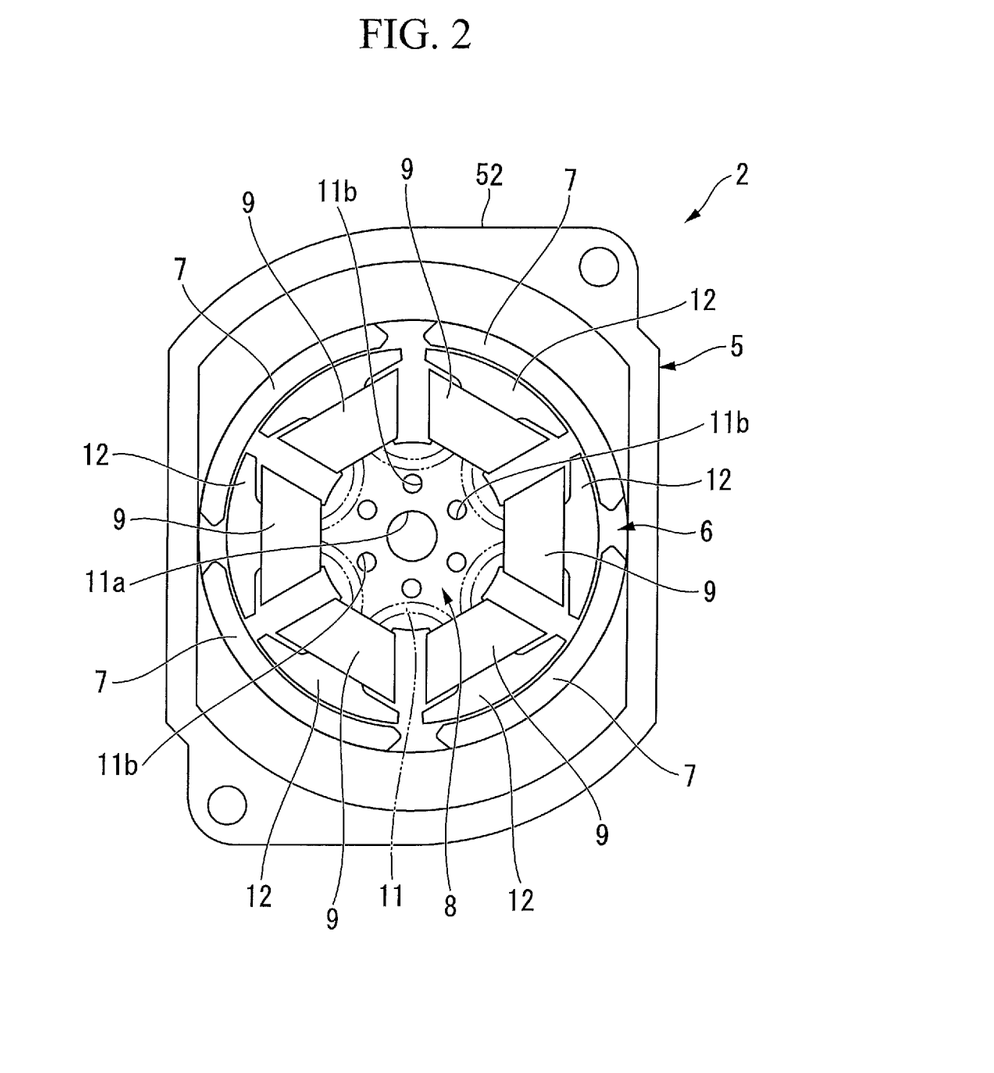
FIG. 2 is a plan view of an electric motor according to the first embodiment of the present invention when seen in an axial direction thereof.

FIG. 1 is a longitudinal cross-sectional view of a reduction motor 1 to which an electric motor 2 according to the embodiment is applied. FIG. 2 is a plan view of the electric motor 2 when seen in an axial direction thereof.

As shown in FIGS. 1 and 2, the reduction motor 1 is a motor used to drive, for example, a wiper of an automobile. The reduction motor 1 includes the electric motor 2, and a speed reduction mechanism 4 connected to a rotary shaft 3 of the electric motor 2. The electric motor 2 has a tubular yoke 5 having a bottom section, and an armature 6 rotatably installed in the yoke 5.

A tubular section 53 of the yoke 5 is formed in a substantially tubular shape. A four-segment type permanent magnet 7 is disposed at an inner circumferential surface of the tubular section 53.

A bearing housing 19 protruding from a center in a radial direction outward in the axial direction is formed at a bottom wall (an end section) 51 of the yoke 5. A sliding bearing 18 configured to rotatably and axially support an end of the rotary shaft 3 is installed at the bearing housing 19. The sliding bearing 18 has a centering function of the rotary shaft 3.

An outer flange section 52 is formed at an opening section 53a of the tubular section 53. A bolt hole (not shown) is formed at the outer flange section 52. As a bolt (not shown) is inserted into the bolt hole and threaded into a bolt hole (not shown) formed in a gear housing 23 (to be described later) of the speed reduction mechanism 4, the yoke 5 is fastened and fixed to the speed reduction mechanism 4.

The armature 6 includes an armature core 8 fitted and fixed to the rotary shaft 3 from the outside thereof, an armature coil 9 wound on the armature core 8, and a commutator 10 disposed at the other end side of the rotary shaft 3. The armature core 8 is formed by stacking plate members formed of a magnetic material and punched by pressing or the like in the axial direction (a stacked core), or by pressure-forming a soft magnetic powder (a pressed powder core). The armature core 8 has a substantially columnar core main body 11.

A through-hole 11a into which the rotary shaft 3 is press-fitted is formed in the core main body 11 at substantially a center in the radial direction. In addition, six substantially T-shaped teeth 12 are radially formed at an outer circumferential section of the core main body 11 when seen in a plan view in the axial direction. As the teeth 12 are radially formed at the outer circumferential section of the core main body 11, six dovetail groove-shaped slots 13 are formed between the neighboring teeth 12.

The armature coil 9 is wound on the armature core 8 via these slots 13.

Here, six holes 11b having circular cross-sections passing in the axial direction are formed in the core main body 11 in a circumferential direction thereof at positions corresponding to roots of the teeth 12. More specifically, the holes 11b are formed between the through-holes 11a of the core main body 11 and the teeth 12 slightly closer to the through-holes 11a than a substantial center in the radial direction between these through-holes 11a and the roots of the teeth 12. The holes 11b are formed to accelerate convection of air in the electric motor 2 and suppress an increase in temperature of the electric motor 2.

The commutator 10 is fitted and fixed to the rotary shaft 3 at a position closer to the other end thereof than the armature core 8 from the outside. Eighteen segments 15 formed of a conductive material are attached to an outer circumferential surface of the commutator 10. The segments 15 are formed of metal plate pieces elongated in the axial direction and fixed in the circumferential direction at equal intervals while being insulated from each other.

Here, provided that the number of permanent magnets 7 disposed in the yoke 5, i.e., the number of magnetic poles, is set as P, the number of slots 13 is set as Sr, the number of segments 15 is set as Se, and n is set as a natural number of 3 or more.

The number of magnetic poles P, the number of slots Sr, and the number of segments S are set to satisfy $$P:Sr:Se = 2:3:3n \quad (1)$$

In the embodiment, since the number of permanent magnets 7 is set to 4 (the number of magnetic poles is 4), the number of slots 13 is set to 6 and the number of segments 15 is set to 18, n is set to 3 and the above-mentioned equation (1) is satisfied.

In addition, a riser 16 bent to an outer diameter side in a folding-back shape is integrally formed with an end section of each of the segments 15 near the armature core 8. A terminal section of the armature coil 9 is turned around the riser 16 and fixed thereto by fusing or the like. Accordingly, the armature coil 9 corresponding to the segment 15 is electrically connected to the segment 15.

Further, a connecting wire 17 (see FIG. 4) is turned around the riser 16 corresponding to each of the segments 15, which reach the same electric potential. The connecting wire 17 is fixed to the riser 16 by fusing. The connecting wire 17 is a member configured to short-circuit the segments 15, which reach the same electric potential, and is wired between the commutator 10 and the armature core 8 (to be described below).

The commutator 10 including the above-mentioned configuration is installed to be opposite to the gear housing 23 of the speed reduction mechanism 4. The gear housing 23 is constituted by a housing main body 42 having substantially a box shape, formed of die-cast aluminum and configured to receive a gear group 41 of the speed reduction mechanism 4, and a bottom plate 43 formed of a resin and configured to close an opening section 42a of the housing main body 42. The opening section 42a is formed in one surface of the housing main body 42. A brush receiving section 22 is integrally formed with the housing main body 42 near the electric motor 2. The commutator 10 of the electric motor 2 is installed to be opposite to the brush receiving section 22.

(Brush Receiving Section)

Figure 3:
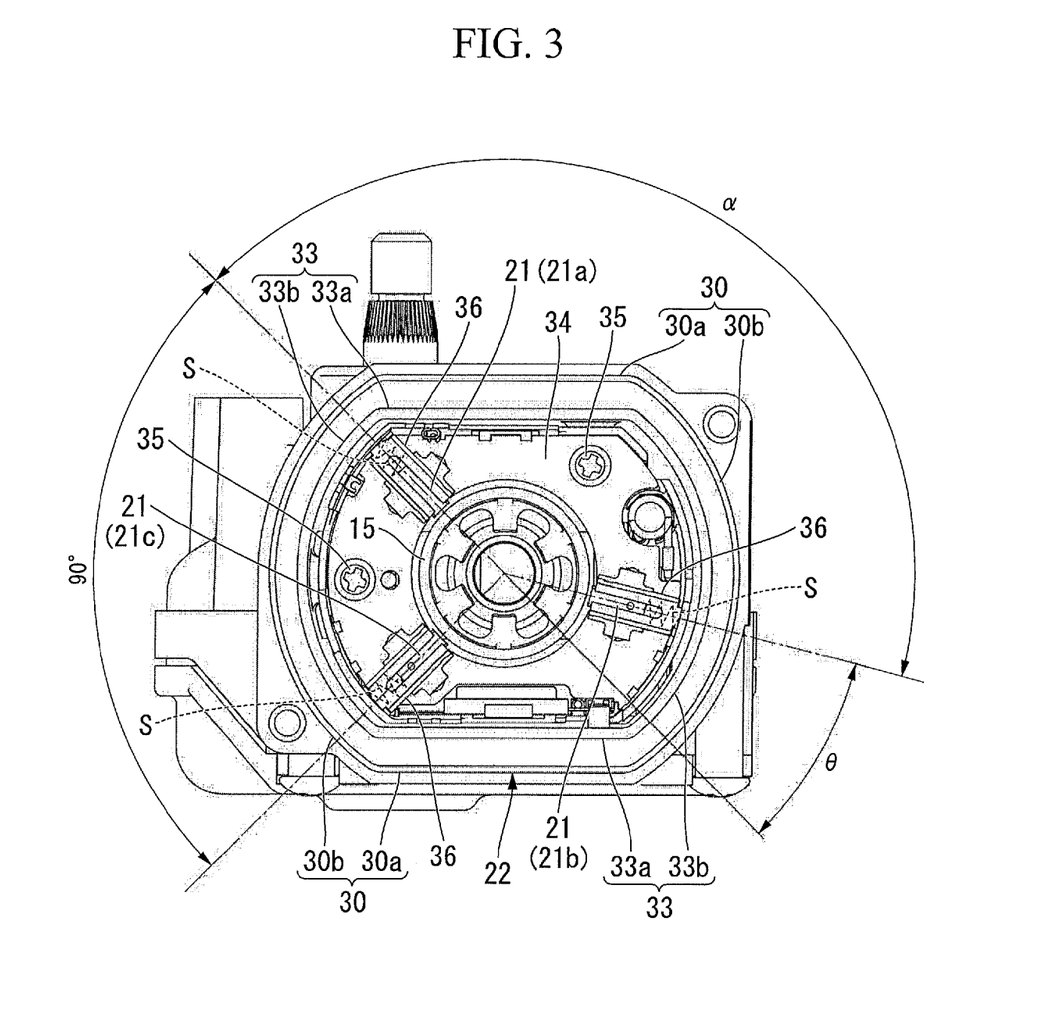
FIG. 3 is a plan view of a brush receiving section according to the first embodiment of the present invention.

FIG. 3 is a plan view of the brush receiving section 22.

As shown in FIG. 3, the brush receiving section 22 is a member formed in a concave shape to have a concave section formed in the gear housing 23 near the electric motor 2. A circumferential wall 30 of the brush receiving section 22 is formed in a substantially elliptical cross-section. The circumferential wall 30 of the brush receiving section 22 is constituted by a flat wall 30a and an arc-shaped wall 30b.

A cover 33 formed in a tubular shape having a substantially elliptical cross-section is installed inside the brush receiving section 22 to correspond thereto. The cover 33 also has a flat wall 33a and an arc-shaped wall 33b. Further, a holder stay 34 configured to correspond to the cover 33 is installed inside the cover 33. The holder stay 34 is fastened and fixed to a sidewall 42b of the housing main body 42 by a bolt 35.

Three brush holders 36 are installed at the holder stay 34 in the circumferential direction. Brushes 21 are installed at the brush holders 36 to protrude and retract and are biased via springs S. Tip sections of these brushes 21 are biased by the springs S to come in sliding contact with the segments 15 of the commutator 10. In addition, the brush 21 is electrically connected to an external power supply (not shown), for example, a battery mounted on an automobile. Thus, power can be supplied to the commutator 10 from the external power supply (not shown).

The brush 21 is constituted by a low speed brush 21a and a high speed brush 21b connected to a positive electrode side, and a common brush 21c commonly used with the low speed brush 21a and the high speed brush 21b and connected to a negative electrode side. The low speed brush 21a and the common brush 21c are disposed at an interval of an electrical angle of 180°, i.e., a mechanical angle of 90° in the circumferential direction. On the other hand, the high speed brush 21b is disposed to be spaced an angle α from the low speed brush 21a in the circumferential direction. In the embodiment, the common brush 21c will be described as a negative electrode side, and the low speed brush 21a and the high speed brush 21b will be described as a positive electrode side. However, the positive electrode side and the negative electrode side may be reversed.

Here, the segments 15, which reach the same electric potential as the commutator 10, i.e., the segments 15 opposite to each other about the rotary shaft 3, are short-circuited by the connecting wire 17. For this reason, power can be supplied to the segments that are not in sliding contact with the brush 21. Accordingly, the high speed brush 21b is disposed at a position at which an angle is more advanced than that of the low speed brush 21a by an angle θ.

(Connection Structure of Connecting Wire and Winding Structure of Armature Coil)

Here, a connection structure of the connecting wire 17 and a winding structure of the armature coil 9 will be described with reference to FIG. 4.

Figure 4:
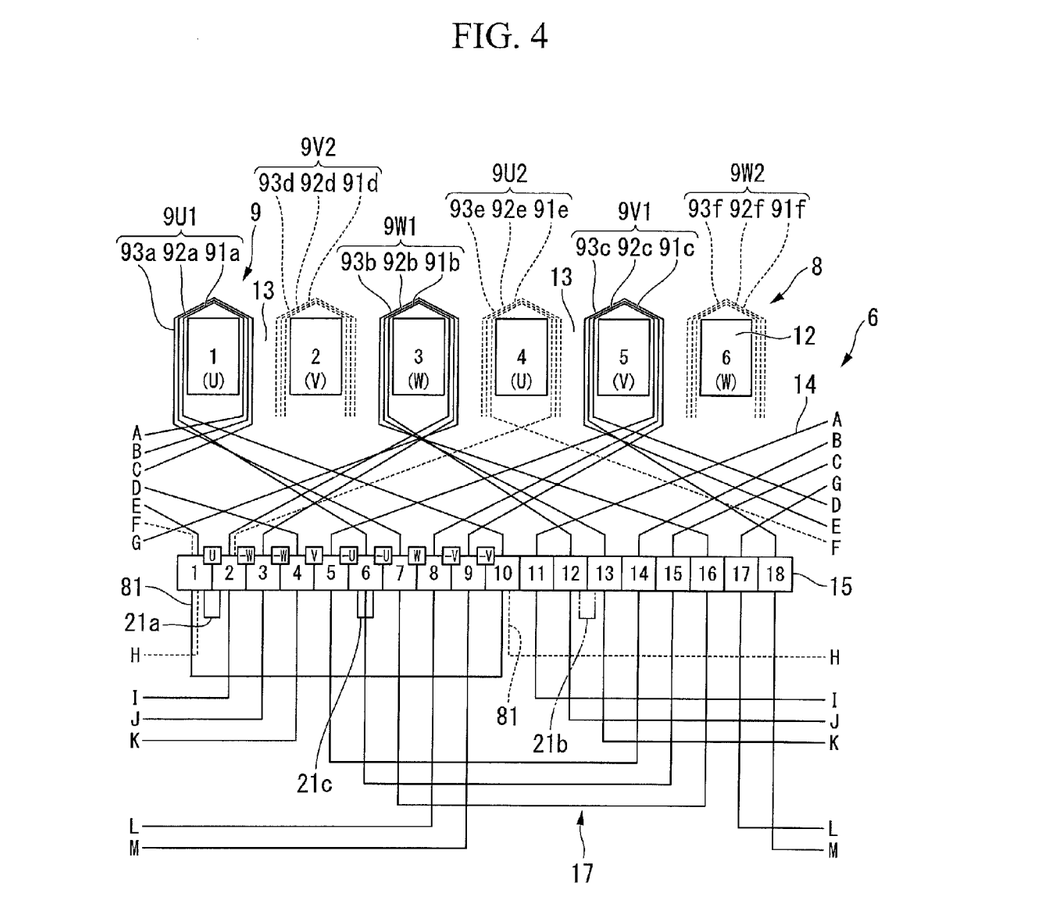
FIG. 4 is a deployment view of an armature of the first embodiment of the present invention.

FIG. 4 is a deployment view of the armature 6, and a gap between the neighboring teeth 12 corresponds to the slot 13. In FIG. 4, the segments 15, the teeth 12, and the wound armature coils 9 will be designated by reference numerals and described.

As shown in FIG. 4, a U phase, a V phase, and a W phase are sequentially assigned to the teeth 12 in the circumferential direction. That is, the U phase is assigned to the first and fourth teeth 12, the V phase is assigned to the second and fifth teeth 12, and the W phase is assigned to the third and sixth teeth 12. In addition, the segments 15, which reach the same electric potential, are short-circuited by the connecting wire 17. Here, a position corresponding to a first number, among numbers designated to the segments 15, is a position corresponding to the first tooth 12.

Then, the armature coil 9 and the connecting wire 17 wound on the teeth 12 are formed at the armature core 8 or the riser 16 of the commutator 10 as a winding 14 is wound through a double-flyer method. The double-flyer method is a method in which the winding 14 is simultaneously wound around two places having a point symmetrical relation about the rotary shaft 3, which will be described below in detail.

Two winding-start ends 81 of the winding 14 are provided. The winding-start ends 81 of the winding 14 are turned around the riser 16 of the first segment 15 and the riser 16 of the tenth segment 15, which reach the same electric potential.

Among them, the winding 14 in which the winding-start end 81 is turned around the riser 16 of the first segment 15 is turned around the tenth segment 15 having the same electric potential as of the first segment 15. Then, the winding 14 is pulled into the slot 13 between the first and sixth teeth 12. Next, when the winding 14 is wound around each of the teeth 12 N (N is a natural number of 1 or more) times, the winding 14 is wound around the first tooth 12 N/3 times in a forward direction to form a U phase coil 91a.

Next, the winding 14 is pulled out of the slot 13 between the first and second teeth 12. The winding 14 is turned around the riser 16 of the eleventh segment 15 adjacent to the tenth segment 15 while being wired to be turned around the rotary shaft 3. Next, the winding 14 is turned around the riser 16 of the second segment 15 having the same electric potential as the eleventh segment 15. Then, the winding 14 is pulled into the slot 13 between the third and fourth teeth 12. Then, the winding 14 is wound around the third tooth 12 N/3 times in a reverse direction to form a "−W phase" coil 91b.

Next, the winding 14 is pulled out of the slot 13 between the second and third teeth 12. The winding 14 is turned around the riser 16 of the twelfth segment 15 adjacent to the eleventh segment 15. Next, the winding 14 is turned around the riser 16 of the third segment 15 having the same electric potential as the twelfth segment 15. Then, the winding 14 is pulled into the slot 13 between the third and fourth teeth 12. Then, the winding 14 is wound around the third tooth 12 N/3 times in the reverse direction to form a "−W phase" coil 92b.

Next, the winding 14 is pulled out of the slot 13 between the second and third teeth 12. The winding 14 is turned around the riser 16 of the thirteenth segment 15 adjacent to the twelfth segment 15. Next, the winding 14 is turned around the riser 16 of the fourth segment 15 having the same electric potential as the thirteenth segment 15. Then, the winding 14 is pulled into the slot 13 between the fourth and fifth teeth 12 while being wired to be turned around the rotary shaft 3. Then, the winding 14 is wound around the fifth tooth 12 N/3 times in the forward direction to form a V phase coil 91c.

Next, the winding 14 is pulled out of the slot 13 between the fifth and sixth teeth 12. The winding 14 is turned around the riser 16 of the fifth segment 15 adjacent to the fourth segment 15 while being wired to be turned around the rotary shaft 3. Next, the winding 14 is turned around the riser 16 of the fourteenth segment 15 having the same electric potential as the fifth segment 15. Then, the winding 14 is pulled into the slot 13 between the first and second teeth 12 while being wired to be turned around the rotary shaft 3. Then, the winding 14 is wound around the first tooth 12 N/3 times in the reverse direction to form a "−U phase" coil 92a.

Next, the winding 14 is pulled out of the slot 13 between the first and sixth teeth 12. The winding 14 is turned around the riser 16 of the sixth segment 15 adjacent to the fifth segment 15. Next, the winding 14 is turned around the riser 16 of the fifteenth segment 15 having the same electric potential as the sixth segment 15. Then, the winding 14 is pulled into the slot 13 between the first and second teeth 12 again. Then, the winding 14 is wound around the first tooth 12 N/3 times in the reverse direction to form a "−U phase" coil 93a.

Next, the winding 14 is pulled out of the slot 13 between the first and sixth teeth 12. The winding 14 is turned around the riser 16 of the seventh segment 15 adjacent to the sixth segment 15. Next, the winding 14 is turned around the riser 16 of the sixteenth segment 15 having the same electric potential as the seventh segment 15. Then, the winding 14 is pulled into the slot 13 between the second and third teeth 12. Then, the winding 14 is wound around the third tooth 12 N/3 times in the forward direction to form a W phase coil 93b.

Next, the winding 14 is pulled out of the slot 13 between the first and sixth teeth 12. The winding 14 is turned around the riser 16 of the seventh segment 15 adjacent to the sixth segment 15. Next, the winding 14 is turned around the riser 16 of the sixteenth segment 15 having the same electric potential as of the seventh segment 15. Then, the winding 14 is pulled into the slot 13 between the second and third teeth 12. Then, the winding 14 is wound around the third tooth 12 N/3 times in the forward direction to form a W phase coil 93b.

Next, the winding 14 is pulled out of the slot 13 between the third and fourth teeth 12. The winding 14 is turned around the riser 16 of the seventeenth segment 15 adjacent to the sixteenth segment 15 while being wired to be turned around the rotary shaft 3. Next, the winding 14 is turned around the riser 16 of the eighth segment 15 having the same electric potential as the seventeenth segment 15. Then, the winding 14 is pulled into the slot 13 between the fifth and sixth teeth 12. Then, the winding 14 is wound around the fifth tooth 12 N/3 times in the reverse direction to form a "−V phase" coil 92c.

Next, the winding 14 is pulled out of the slot 13 between the fourth and fifth teeth 12. The winding 14 is turned around the riser 16 of the eighteenth segment 15 adjacent to the seventeenth segment 15. Next, the winding 14 is turned around the riser 16 of the ninth segment 15 having the same electric potential as of the eighteenth segment 15. Then, the winding 14 is pulled into the slot 13 between the fifth and sixth teeth 12 again. Then, the winding 14 is wound around the fifth tooth 12 N/3 times in the reverse direction to form a "−V phase" coil 93c.

After that, the winding 14 is pulled out of the slot 13 between the fourth and fifth teeth 12. The winding 14 is connected to the first segment 15 adjacent to the eighteenth segment 15 while being wired to be turned around the rotary shaft 3.

According to the above-mentioned configuration, a U phase armature coil 9U1 constituted by the U phase coil 91a, the "−U phase" coil 92a and the "−U phase" coil 93a and wound N times is formed at the first tooth 12. In addition, a W phase armature coil 9W1 constituted by the "−W phase" coil 91b, the "−W phase" coil 92b and the W phase coil 93b and wound N times is formed at the third tooth 12. Further, a V phase armature coil 9V1 constituted by the V phase coil 91c, the "−V phase" coil 92c and the "−V phase" coil 93c and wound N times is formed at the fifth tooth 12.

In addition, the winding 14 in which the winding-start end 81 is turned around the riser 16 of the tenth segment 15 is point-symmetrically wired about the rotary shaft 3 simultaneously with the winding 14 in which the winding-start end 81 is turned around the riser 16 of the above-mentioned first segment 15.

Then, a V phase armature coil 9V2 constituted by a V phase coil 91d, a "−V phase" coil 92d and a "−V phase" coil 93d and wound N times is formed at the second tooth 12. In addition, a U phase armature coil 9U2 constituted by a U phase coil 91e, a "−U phase" coil 92e and a "−U phase" coil 93e and wound N times is formed at the fourth tooth 12. Further, a W phase armature coil 9W2 constituted by a "−W phase" coil 91f, a "−W phase" coil 92f and a W phase coil 93f and wound N times is formed at the sixth tooth 12.

In this way, the armature coil 9 is constituted by the U phase armature coils 9U1 and 9U2 formed at the first and fourth teeth 12, the V phase armature coils 9V1 and 9V2 formed at the second and fifth teeth 12, and the W phase armature coils 9W1 and 9W2 formed at the third and sixth teeth 12.

Then, the respective phase coils 91a to 93f are electrically connected between the neighboring segments 15 in a sequence of U, "−W," "−W," V, "−U," "−U," W, "−V," and "−V" phases.

Here, as shown in FIG. 2 in detail, the winding 14 is wound around each of the teeth 12 through the intensive winding method. For this reason, there is no need to install a connecting wire of the winding 14 between the neighboring teeth 12. That is, overlapping of a coil end 9a of the armature coil 9 with an end section in the axial direction of the armature core 8 is reduced compared with the case in which the winding 14 is wound therearound through the distributed winding method. For this reason, the end section in the axial direction of the core main body 11 of the armature core 8 is not covered by the winding 14, and thus the hole 11b formed in the core main body 11 is exposed.

In addition, the winding 14 wired between the armature core 8 and the riser 16 of the segment 15 is wired to be turned around the rotary shaft 3. For this reason, an increase in winding weight between the commutator 10 and the armature core 8 can be suppressed.

(Speed Reduction Mechanism)

As shown in FIG. 1, the gear group 41 is received in the housing main body 42 of the gear housing 23 to which the electric motor 2 is attached. The gear group 41 is constituted by a worm shaft 25 connected to the rotary shaft 3 of the electric motor 2, a pair of stepped gears 26 and 26 meshed with the worm shaft 25, and a spur gear 27 meshed with the stepped gear 26.

The worm shaft 25 has one end connected to the rotary shaft 3 and the other end rotatably and axially supported by the housing main body 42. A connecting section 24 between the worm shaft 25 and the rotary shaft 3, i.e., the other end of the rotary shaft 3, is rotatably supported by a rolling bearing 32 installed at a bottom wall 31 of the brush receiving section 22 formed at the housing main body 42.

In addition, the worm shaft 25 has a first screw section 25a and a second screw section 25b, which are reverse screws with respect to each other. The first screw section 25a and the second screw section 25b are formed as a single thread screw or a double thread screw. However, the first screw section 25a and the second screw section 25b may be formed as three or more thread screw.

The pair of stepped gears 26 is disposed at both sides to sandwich the worm shaft 25. The pair of stepped gears 26 is engaged with the first screw section 25a and the second screw section 25b.

The pair of stepped gears 26 is a member in which a worm wheel 28 meshed with the worm shaft 25 and a small diameter gear 29 having a smaller diameter than the worm wheel 28 are integrally formed with each other. An idler shaft 61 is press-fitted into a center in the radial direction of the stepped gear 26. The idler shaft 61 is installed to protrude from an opposite side of the small diameter gear 29. The protruding end section 61a is rotatably and axially supported by the housing main body 42. In addition, a tip of the small diameter gear 29 present at an end section of the idler shaft 61 opposite to the end section 61a is rotatably and axially supported by the bottom plate 43.

In this way, the pair of stepped gears 26 is configured such that both ends thereof are axially supported by the housing main body 42 and the bottom plate 43. Then, the pair of stepped gears 26 is rotated in the same direction to transmit rotation of the worm shaft 25 to the spur gear 27. That is, a so called Marshal mechanism is constituted by the worm shaft 25 and the pair of stepped gears 26, and thrust power generated from the worm shaft 25 is offset by the pair of stepped gears 26.

The spur gear 27 is engaged with the small diameter gear 29 of the stepped gear 26. A boss section 65 is formed at a center in the radial direction of the spur gear 27 to protrude toward the bottom plate 43. The boss section 65 is rotatably supported by the bottom plate 43. In addition, an output shaft 62 is press-fitted into the boss section 65. The output shaft 62 protrudes from a bottom wall (an end section) 42c of the housing main body 42. The boss section 63 is formed at the bottom wall 42c of the housing main body 42 at a position corresponding to the output shaft 62 to protrude outward. A sliding bearing 64 configured to rotatably and axially support the output shaft 62 is installed at the boss section 63.

A tapered section 66 gradually tapered toward the tip is formed at a portion of the output shaft 62 protruding from the housing main body 42. A serration 67 is formed at the tapered section 66. Accordingly, for example, an external mechanism configured to drive a wiper or the like can be connected to the output shaft 62.

In addition, a connector 68 is installed at the sidewall 42b of the housing main body 42 to protrude in the axial direction of the rotary shaft 3. The connector 68 is connected to a control instrument (not shown) and supplies power of an external power supply (not shown) to the electric motor 2.

A base plate 71 is disposed at an inner surface 43a of the bottom plate 43 configured to close the opening section 42a of the housing main body 42. A terminal 72 configured to electrically connect the connector 68 and the electric motor 2 is installed at the base plate 71. In addition, contactors 73a and 73b are installed at the base plate 71. The contactors 73a and 73b are sliding contacts configured to detect a rotating position of the spur gear 27. A contact plate is installed at a portion of the spur gear 27 with which the contactors 73a and 73b come in sliding contact.

Next, according to rotation of the spur gear 27, i.e., the output shaft 62, a rotating position of the output shaft 62 can be detected by a variation in contact position between the contactors 73a and 73b and the contact plate (not shown) or contact/non-contact between the contactors 73a and 73b and the contact plate (not shown). A signal detected by the contactors 73a and 73b is output to the control instrument (not shown) via the terminal 72 to perform rotational control of the electric motor 2.

(Action of Electric Motor)

Next, an action of the electric motor 2 will be described based on FIG. 4.

For example, as show in FIG. 4, the case in which a voltage is applied between the low speed brush 21a and the common brush 21c in a state in which the low speed brush 21a is disposed between the first and second segments 15 and the common brush 21c is disposed at the sixth segment 15 will be described.

In this case, the low speed brush 21a is disposed between the first and second segments 15 and 15. For this reason, normally wound U phase coils 91a and 91e are short-circuited.

In addition, a current flows through "−U" phase coils 92a and 92e wound around the first tooth 12 and the fourth tooth 12 in the reverse direction (a counterclockwise direction of FIG. 4). On the other hand, a current flows through "−U" phase coils 93a and 93e wound around the first tooth 12 and the fourth tooth 12 in the forward direction (a clockwise direction of FIG. 4). In this way, currents in opposite directions flow through the "−U" phase coils 92a and 92e and the "−U" phase coils 93a and 93e that are wound around the first tooth 12 and the fourth tooth 12 and not short-circuited by the brushes 21a and 21c. For this reason, magnetic fields are offset and there is no torque generated between the coils and the permanent magnet 7.

On the other hand, currents flow through the V phase coils 91c and 91d, the "−V phase" coils 92c and 92d, and the "−V phase" coils 93c and 93d wound around the second tooth 12 and the fifth tooth 12 in the forward direction.

In addition, currents flow through the "−W phase" coils 91b and 91f, the "−W phase" coils 92b and 92f, and the W phase coils 93b and 93f wound around the third tooth 12 and the sixth tooth 12 in the reverse direction.

Then, magnetic fields are formed at the second, third, fifth and sixth teeth 12. These magnetic fields are sequentially formed in the circumferential direction. For this reason, a magnetic suction force or repulsive force acts between the magnetic fields formed at the teeth 12 and the permanent magnet 7 at point-symmetrical positions about the rotary shaft 3 in the same direction. Then, the rotary shaft 3 is thereby rotated.

When the rotary shaft 3 starts to rotate, the segments 15 in sliding contact with the brushes 21a and 21c are sequentially changed to switch a direction of the current flowing through the coil, i.e., rectification is performed. Accordingly, the rotary shaft 3 continues to rotate.

On the other hand, when a voltage is applied between the high speed brush 21b and the common brush 21c, since the high speed brush 21b is present at a position at which in angle is more advanced than the low speed brush 21a by the angle θ (see FIGS. 3 and 4), in comparison with the case in which the voltage is applied between the low speed brush 21a and the common brush 21c, the number of effective conductors electrically connected is reduced. For this reason, when the voltage is applied between the high speed brush 21b and the common brush 21c, in comparison with the case in which the electric motor 2 is angularly advanced and the voltage is applied between the low speed brush 21a and the common brush 21c, the electric motor 2 is operated at a larger number of revolutions.

As electrical connection to the armature coil 9 is performed, a temperature in the electric motor 2 is increased.

Here, the holes 11b passing in the axial direction at the positions corresponding to the roots of the teeth 12 are formed in the core main body 11 of the armature core 8 in the circumferential direction. As the holes 11b are formed, convection of air in the electric motor 2 is accelerated and an increase in temperature of the electric motor 2 is suppressed.

This will be described more specifically with reference to FIG. 5.

Figure 5:
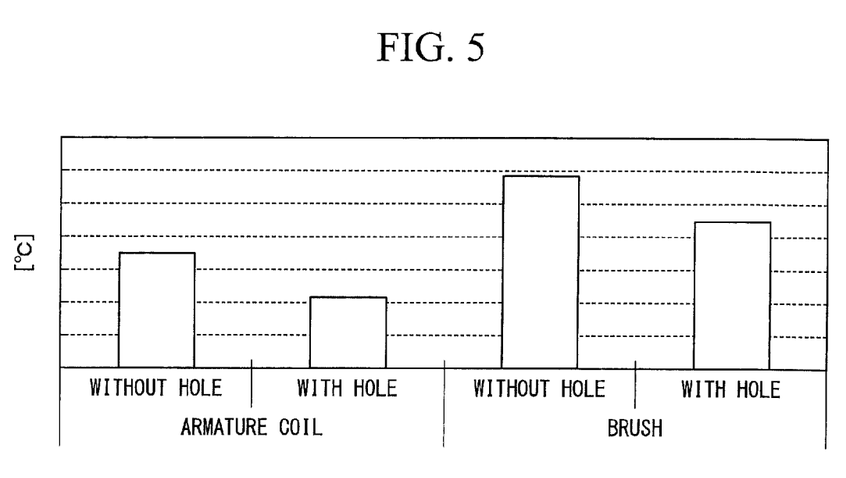
FIG. 5 is a temperature graph of an armature coil and a brush according to the first embodiment of the present invention.

FIG. 5 is a graph in which a temperature [° C.] of the armature coil 9 is compared according to cases in which the hole 11b is and is not formed, and a temperature [° C.] of the brush 21 (21a, 21b and 21c) is compared according to cases in which the hole 11b is and is not formed.

As shown in FIG. 5, in the armature coil 9 and the brush 21 upon the operation of the electric motor 2, in comparison with the case in which the hole 11b is not formed in the armature core 8, an increase in temperature is suppressed in the case in which the hole 11b is formed.

Here, as shown in FIG. 2, as the electrical connection to the armature coil 9 is performed, the magnetic fields are formed at the teeth 12, and a magnetic path configured to extend between the neighboring teeth in the circumferential direction is formed at the core main body 11 (see a two-dot chain line of FIG. 2). The hole 11b formed in the core main body 11 is disposed slightly closer to the through-hole 11a than a substantial center in the radial direction between the through-hole 11a and the roots of the teeth 12. For this reason, the formation of the magnetic path is not disturbed.

(Effects)

According to the above-mentioned first embodiment, the four permanent magnets 7 are installed at the yoke 5, the six slots 13 are formed in the armature core 8, the eighteen segments 15 are formed at the commutator 10, and thus an order determined by a least common multiple between the number of magnetic poles and the number of slots can be 12. On the other hand, in the electric motor of the related art, since the number of magnetic poles is set to 4 and the number of slots is set to 16, an order becomes 32. For this reason, since the order can be reduced in comparison with the related art without deteriorating the motor performance, high pitch noise can be prevented upon high speed rotation of the electric motor 2.

In addition, while the number of slots of the related art is 16, in the above-mentioned first embodiment, the number of slots of the armature core 8 is set to 6. For this reason, as the number of slots is reduced, the shape of the armature core 8 can be simplified, and productivity of the armature 6 can be increased.

Further, as the number of slots is reduced, each of the slots 13 can be set to be large. For this reason, the number of times the winding 14 is wound on each of the teeth 12 can be set to be large. As a result, the armature core 8 can be reduced in size and weight.

Then, in the above-mentioned first embodiment, the number of segments is set to be three times of the number of slots. For this reason, the number of segments per one pole pair is larger than that of the related art. For this reason, the voltage between the segments 15 can be reduced, and rectification can be further improved than that of the related art. In addition, since the number of effective conductors of the armature coil 9 per one segment 15 is reduced, it is possible to easily cope with a variation in speed due to the high speed brush 21b.

Further, in the above-mentioned first embodiment, the winding 14 is wound around each of the teeth 12 through the intensive winding method. For this reason, there is no need to install a connecting wire of the winding 14 between the neighboring teeth 12. As a result, wire rod cost of the armature coil 9 can be reduced, and the electric motor 2 can be inexpensively provided.

Furthermore, in the above-mentioned first embodiment, the winding 14 is wound around each of the teeth 12 through the intensive winding method. For this reason, as described in the related art, a space factor of the winding 14 can be improved in comparison with the case in which the winding 14 is wound through the distributed winding method. Further, overlapping of the coil end 9a can be reduced. As a result, since copper loss can be reduced, efficiency of the electric motor 2 can be improved. Then, at the same motor performance, the armature core 8 can be reduced in size and the shaft can be reduced in length.

Then, since there is no need to install the connecting wire of the winding 14, the end section in the axial direction of the core main body 11 of the armature core 8 is not covered by the winding 14. For this reason, the hole 11b formed in the core main body 11 can be securely exposed, and convection of air in the electric motor 2 can be accelerated. For this reason, an increase in temperature of the electric motor 2 can be suppressed, and motor efficiency can be improved.

In addition, the hole 11b formed in the core main body 11 is disposed slightly closer to the through-hole 11a than a substantial center in the radial direction between the through-hole 11a and the roots of the teeth 12. For this reason, formation of the magnetic path is not disturbed. For this reason, the highly efficient electric motor 2 can be provided.

Further, the connecting section 24 of the worm shaft 25 and the rotary shaft 3, i.e., the other end of the rotary shaft 3, is rotatably supported by the rolling bearing 32 installed at the housing main body 42. The rolling bearing 32 can reduce sliding resistance in comparison with the sliding bearing. For this reason, the rotary shaft 3 can be efficiently rotated even when the number of revolutions of the rotary shaft 3 is increased. As a result, the highly efficient electric motor 2 can be provided.

Second Embodiment

Next, a second embodiment of the present invention will be described based on FIGS. 6 to 9B.

Figure 6:
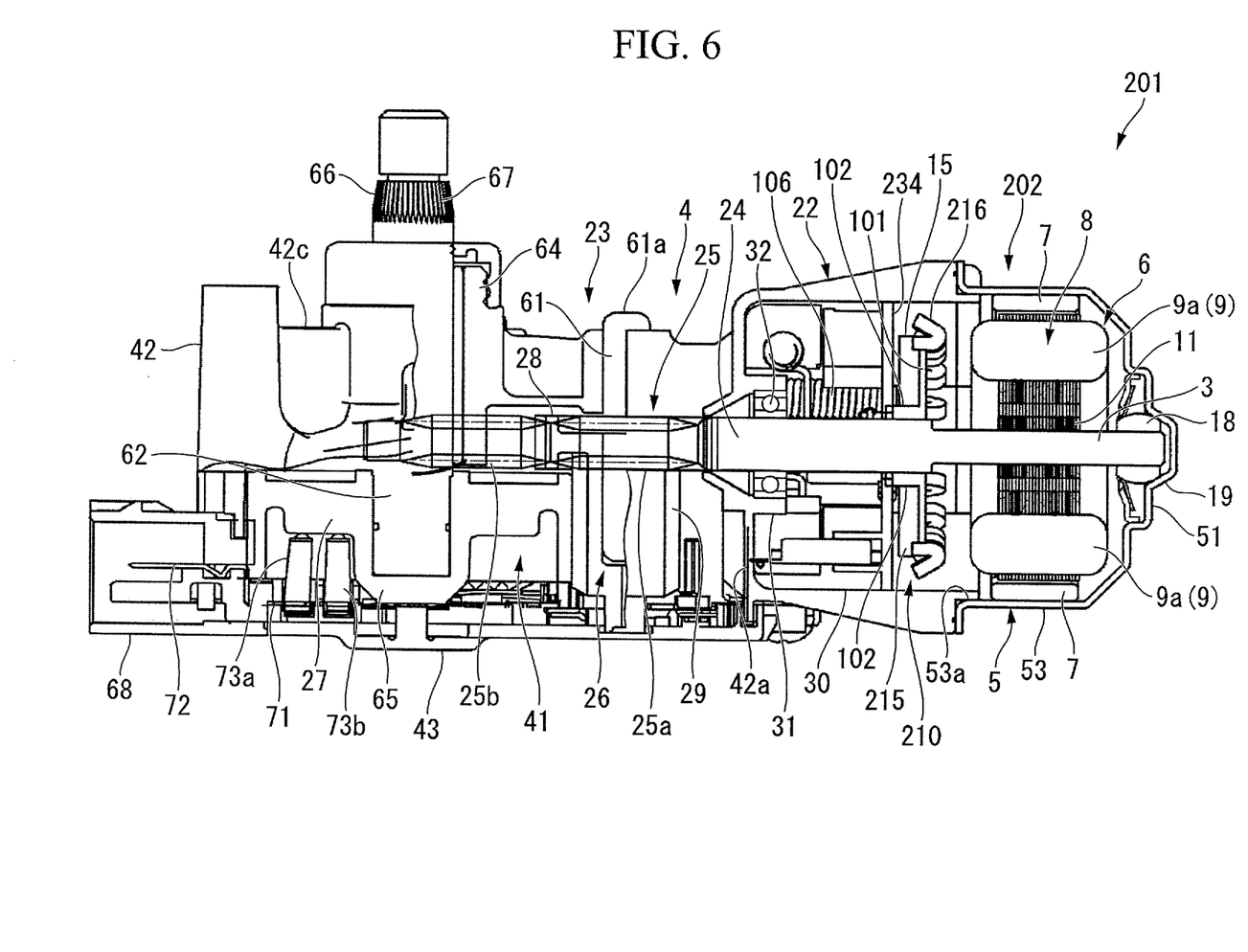
FIG. 6 is a longitudinal cross-sectional view of a reduction motor according to a second embodiment of the present invention.
Figure 7:
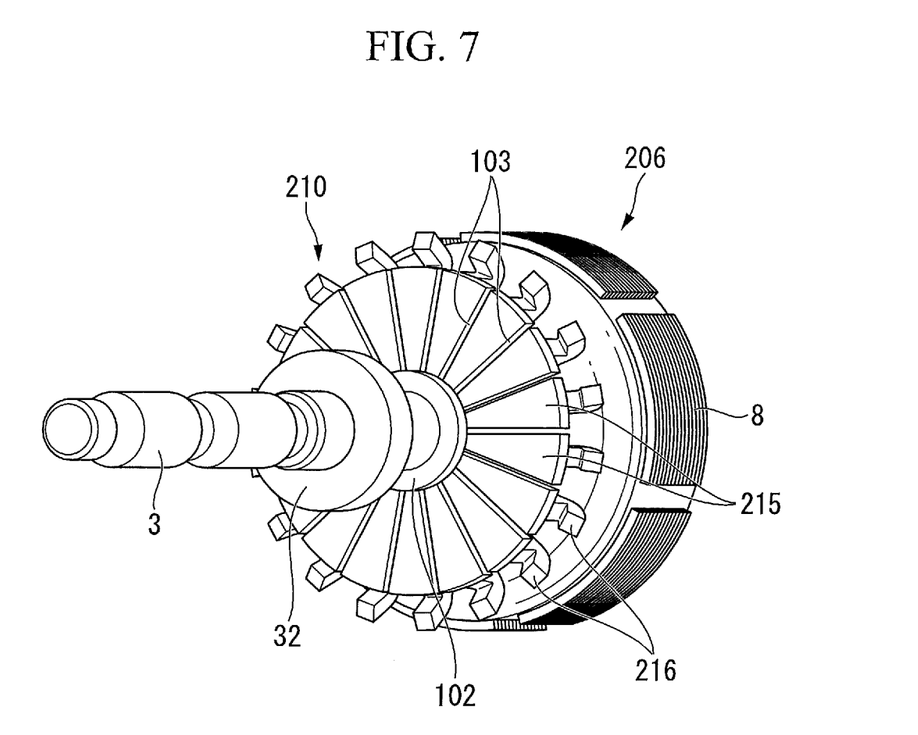
FIG. 7 is a perspective view of an armature according to the second embodiment of the present invention.
Figure 8A:
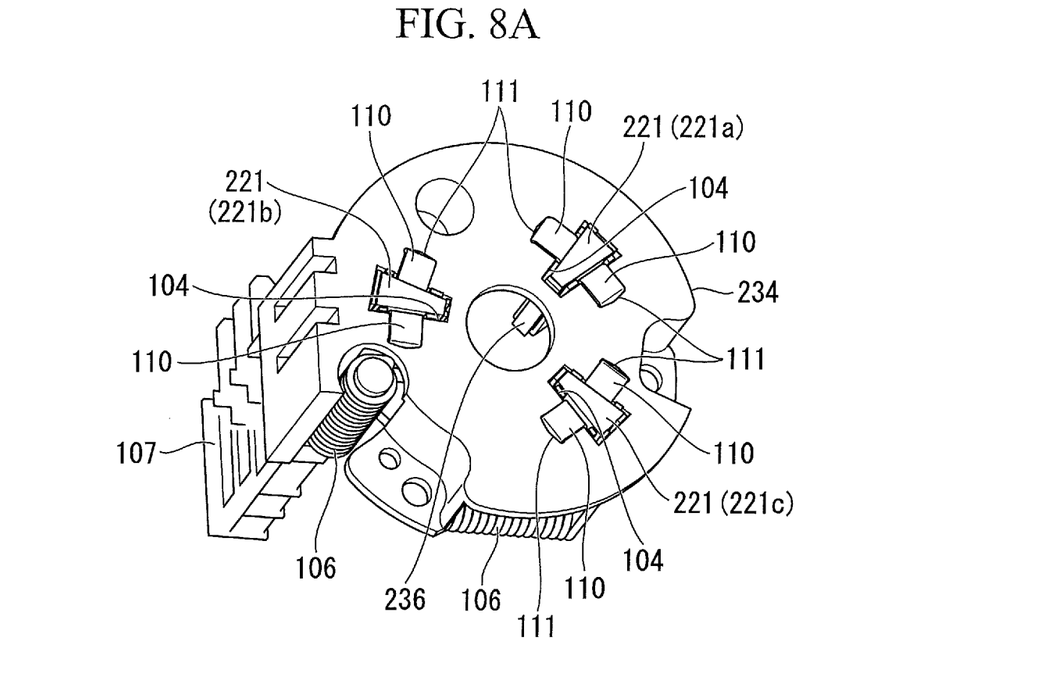
FIG. 8A is a perspective view of a holder stay according to the second embodiment of the present invention.
Figure 8B:
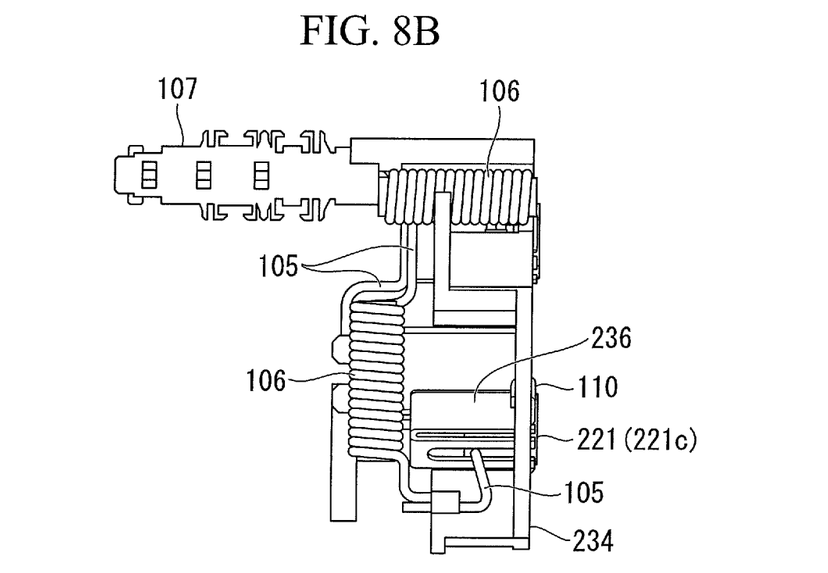
FIG. 8B is a side view of the holder stay according to the second embodiment of the present invention.

FIG. 6 is a longitudinal cross-sectional view of a reduction motor 201 according to the embodiment, corresponding to FIG. 1 of the above-mentioned first embodiment. FIG. 7 is a perspective view of an armature 206 according to the embodiment. FIG. 8A is a perspective view of a holder stay 234. FIG. 8B is a side view of the holder stay 234. In addition, the same aspects as of the first embodiment are designated by the same reference numerals and described.

As shown in FIGS. 6 to 8B, in the embodiment, the reduction motor 201 is a motor used to drive, for example, a wiper of an automobile. The reduction motor 201 has the same basic configuration as in the above-mentioned first embodiment in that the reduction motor 201 includes the electric motor 202 and the speed reduction mechanism 4 connected to the rotary shaft 3 of the electric motor 202, the electric motor 202 has the tubular yoke 5 having the bottom section and the armature 206 rotatably installed in the yoke 5, and in the electric motor 202, the number of permanent magnets 7 disposed in the yoke 5 is four, the number of slots 13 formed in the armature core 8 is 6, the number of segments 15 installed at a commutator 210 is set to 18, the number of magnetic poles P, the number of slots Sr and the number of segments Se satisfy the above-mentioned equation (1), and so on.

Here, the embodiment is distinguished from the above-mentioned first embodiment in that the commutator 210 of the embodiment has a different shape from the commutator 10 of the first embodiment, and thus a shape of a brush 221 in sliding contact with the commutator 210 and a peripheral shape thereof are different from those of the first embodiment.

More specifically, as shown in FIGS. 6 and 7, the commutator 210 of the present embodiment is a flat type disk commutator and has a resin mold body 101 formed in a substantially circular plate shape. A tubular section 102 fitted and fixed to the rotary shaft 3 from the outside is integrally formed with the center in the radial direction of the resin mold body 101.

In addition, a surface of the resin mold body 101 near the speed reduction mechanism 4 is set as a rotary sliding surface with which the brush 221 (to be described below) is in sliding contact. Eighteen segments 215 are disposed on the rotary sliding surface in the circumferential direction at equal intervals. In other words, the segments 215 are radially disposed about the rotary shaft 3 and have substantially a fan shape to gradually expand from a center in the radial direction outward in the radial direction when seen in a plan view in the axial direction. Then, a slit 103 is formed between the segments 215 and 215 neighboring in the circumferential direction to insulate the segments from each other.

Further, an outer end section in the radial direction of each of the segments 215 is formed to extend farther outward in the radial direction than the resin mold body 101. A riser 216 is integrally formed with the outer end section in the radial direction of each of the segments 215 near the armature core 8.

In addition, the brush 221 in sliding contact with the segment 215 is installed at the brush receiving section 22 formed in the gear housing 23 in a concave shape via the holder stay 234. The holder stay 234 is formed in a substantially circular plate shape. Then, holder stay opening sections 104 having substantially a fan shape when seen in a plan view in the axial direction are formed at places corresponding to a low speed brush 221a, a high speed brush 221b, and a common brush 221c that constitute the brush 221.

A brush holder 236 is inserted into each of the holder stay opening sections 104. The brush holder 236 is formed in a substantially rectangular box shape having a brush holder opening section 236a formed at one side. A closed cross section of the brush holder 236 has substantially a fan shape corresponding to the shape of the holder stay opening section 104. Then, the brush holder 236 is disposed at the holder stay opening section 104 to insert the brush holder opening section 236a side of the brush holder 236. That is, the brush holder 236 is disposed such that the longitudinal direction thereof is disposed in the axial direction.

In addition, a pair of engaging claws 110 is formed opposite to each other in the circumferential direction at an outer circumferential edge of the brush holder opening section 236a of the brush holder 236. In addition, a slit 111 that is capable of engaging with the engaging claw 110 is formed in the holder stay 234. According to the above-mentioned configuration, the brush holder 236 is fixed to the holder stay 234.

Further, the brushes 221 (221a, 221b and 221c) having a substantially fan-shaped cross section are received in the brush holder 236 to correspond to the shape of the closed cross section of the brush holder 236 to freely protrude and retract. The brushes 221a, 221b and 221c are in sliding contact with the segments 215 of the commutator 210 while being biased via the spring S (not shown).

In addition, a pigtail 105 is connected to each of the brushes 221a, 221b and 221c. The pigtail 105 is connected to a terminal 107 via a chalk coil 106.

The terminal 107 is electrically connected to an external power supply (not shown), for example, a battery mounted on an automobile. Accordingly, power from the external power supply (not shown) can be supplied to the commutator 210.

Accordingly, according to the embodiment, the same effect as of the above-mentioned first embodiment can be exhibited. In addition, as the commutator 210 is constituted by a flat type disk commutator, the brush holder 236 and the brushes 221 (221a, 221b and 221c) are disposed in the axial direction. For this reason, in the embodiment, like the brushes 21 (21a, 21b and 21c) of the above-mentioned first embodiment, the brushes are not disposed to expand outward in the radial direction (see FIGS. 8A and 8B in comparison with FIG. 3). For this reason, an increase in size of a circumference of the brush 221 can be prevented while maintaining a reduction in size and weight of the entire electric motor 202. In addition, since the brush 221 does not expand outward in the radial direction, a diameter of the commutator 210 may be set to be large.

Here, the segment 215 of the commutator 210 is formed in substantially a fan shape in the axial direction to gradually expand from a center in the radial direction outward in the radial direction. For this reason, when a diameter of the commutator 210 can be set to be large, a width in the circumferential direction of the segment 215 can also be set to be large. For this reason, a lifespan of the brush 221 can be lengthened without extremely reducing the width in the circumferential direction of the brush 221. Further, the same motor performance as the two-pole motor can be obtained.

In addition, in the embodiment, the case in which the brush holder 236 is installed to be inserted into each of the holder stay opening sections 104 of the holder stay 234 has been described. However, the brush holder is not limited thereto and may be configured as will be described below.

(Modified Example of Second Embodiment)

Figure 9A:
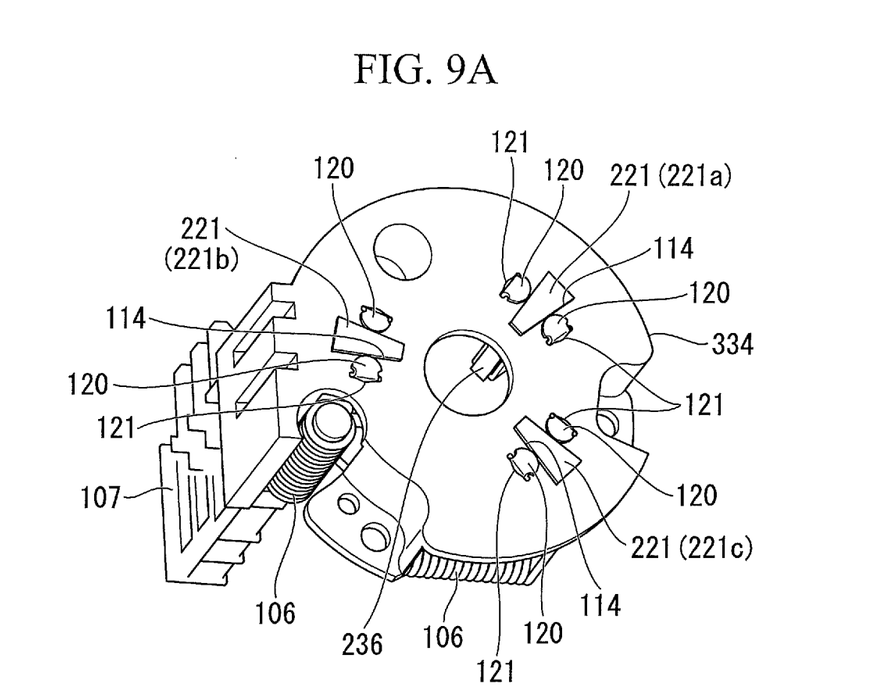
FIG. 9A is a perspective view of a holder stay according to a modified example of the second embodiment of the present invention.
Figure 9B:
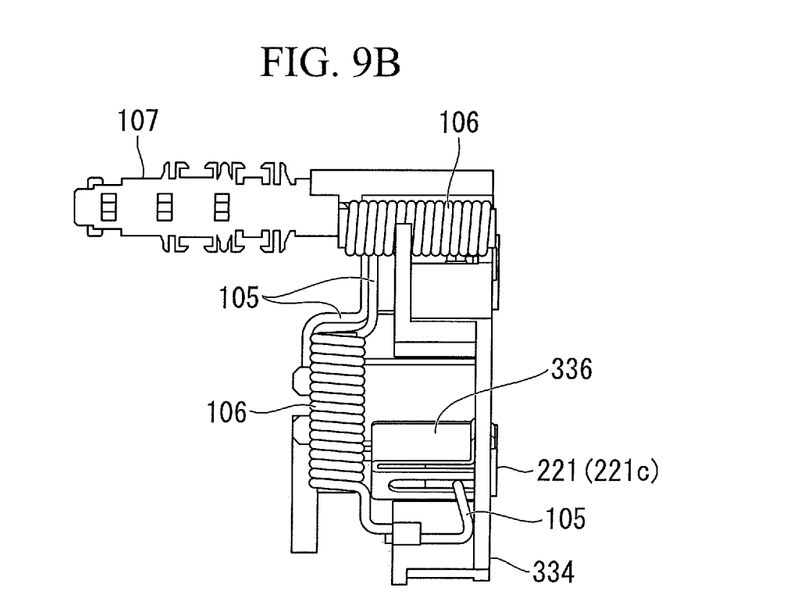
FIG. 9B is a side view of the holder stay according to the modified example of the second embodiment of the present invention.

FIG. 9A is a perspective view of a holder stay 334. FIG. 9B is a side view of the holder stay 334.

That is, as shown in FIGS. 9A and 9B, only the brushes 221 (221a, 221b and 221c) are inserted into holder stay opening sections 114 formed in the holder stay 334. Then, a brush holder 336 configured to hold the brush 221 is installed at a surface of the holder stay 334 near the speed reduction mechanism 4 (a left side of FIG. 9B) to cover the holder stay opening section 114.

In addition, a pair of engaging claws 120 is formed opposite to each other in the circumferential direction at an opening edge of the brush holder 336. In addition, a slit 121 that can engage with the engaging claw 120 is formed in the holder stay 334. According to the above-mentioned configuration, the brush holder 336 is fixed to the holder stay 334.

Even in the case described above, the same effect as of the above-mentioned second embodiment can be exhibited.

Further, the present invention is not limited to the above-mentioned embodiment but may include a configuration in which various modifications are added to the above-mentioned embodiment without departing from the scope of the present invention.

For example, in the above-mentioned embodiments, the case in which the electric motors 2 and 202 are motors in which the number of permanent magnets 7 is set to 4 (the number of magnetic poles is set to 4), the number of slots 13 is set to 6, and the number of segments 15 is set to 18 has been described. However, the embodiment is not limited thereto but the number of magnetic poles P, the number of slots Sr, and the number of segments Se may be set to satisfy Equation (1). According to the above-mentioned configuration, the number of slots and the order can be reduced in comparison with the motor of the related art having the same motor performance.

In addition, in the above-mentioned embodiments, the case in which the six holes 11b having the circular cross section passing in the axial direction are formed in the core main body 11 of the armature core 8 at positions corresponding to the roots of the teeth 12 in the circumferential direction has been described. However, the shape of the hole 11b is not limited to a circular cross section. In addition, the number of formed holes 11b is not limited to 6. Further, the positions at which the holes 11b are formed are not limited to the positions corresponding to the roots of the teeth 12 of the core main body 11 but the holes 11b may be formed at arbitrary positions.

INDUSTRIAL APPLICABILITY

According to the above-mentioned electric motor, since the number of slots can be reduced without deteriorating the motor performance, the order of the motor can be reduced. For this reason, high pitch noise can be prevented upon high speed rotation of the motor.

REFERENCE SIGNS LIST 1, 201 reduction motor
2, 202 electric motor
3 rotary shaft
5 yoke
7 permanent magnet (magnetic pole)
8 armature core
9 armature coil (coil)
10 commutator
12 teeth
13 slot
15, 215 segment
18 bearing
21, 221 brush
21a, 221a low speed brush
21b, 221b high speed brush
21c, 221c common brush
32 rolling bearing
91a, 91e U phase coil (coil of U phase)
92a, 93a, 92e, 93e −U phase coil (coil of −U phase)
91b, 92b, 91f, 92f −W phase coil (coil of −W phase)
93b, 93f W phase coil (coil of W phase)
91c, 91d V phase coil (coil of V phase)
92c, 93c, 92d, 93d −V phase coil (coil of −V phase)
9U1, 9U2 U phase armature coil
9V1, 9V2 V phase armature coil
9W1, 9W2 W phase armature coil
210 commutator (disk commutator)

The invention claimed is:

1. An electric motor comprising:
    a yoke in which a number of magnetic pole is set to 4;
    a rotary shaft rotatably installed inside the yoke;
    an armature core attached to the rotary shaft, the armature core in which a number of teeth is set to 6 radially extending in a radial direction thereof, and in which a number of slot formed between the teeth is set to 6;
    a coil wound on each of the teeth through an intensive winding method;
    a commutator installed at the rotary shaft adjacent to the armature core, and in which a number of segment disposed in the circumferential direction is set to 18; and
    three brushes constituted by a low speed brush and a high speed brush configured to supply power to the coil via the segments and a common brush commonly used for the brushes;
    the coil wound on the teeth comprises one normal winding coil formed to be wound in a forward direction, and two reverse winding coils wound in a reverse direction,
    when the teeth are sequentially assigned to a U phase, a V phase and a W phase in the circumferential direction, the normal winding coil wound in the phases is set to the coils of the U phase, the V phase and the W phase, and the reverse winding coils wound in the phases are set to the coils of a −U phase, a −V phase and a −W phase,
    the coils of the U phase, the −W phase, the −W phase, the V phase, the −U phase, the −U phase, the W phase, the −V phase and the −V phase are sequentially and electrically connected between the neighboring segment,
    terminal sections of the coils are connected to the segments corresponding to the respective terminal portions of the coils, and
    the segments, which reach a same electric potential are connected to each other by a connecting wire.

2. The electric motor according to claim 1 wherein both end sides in the axial direction of the rotary shaft are rotatably supported via bearings, and at least one of the bearings is a rolling bearing.

3. The electric motor according to claim 2 wherein the commutator is a flat type disk commutator, and the plurality of segments are disposed on a rotary sliding surface of the disk commutator in the circumferential direction.

4. The electric motor according to claim 1 wherein the commutator is a flat type disk commutator, and the plurality of segments are disposed on a rotary sliding surface of the disk commutator in the circumferential direction.

* * * * *